United States Patent [19]

Helm et al.

[11] Patent Number: 5,072,450
[45] Date of Patent: Dec. 10, 1991

[54] METHOD AND APPARATUS FOR ERROR DETECTION AND LOCALIZATION

[75] Inventors: Gordon L. Helm, St. Joseph; Mark D. Nicol; Anthony M. Olson, both of Stevensville, all of Mich.

[73] Assignee: Zenith Data Systems Corporation, Buffalo Grove, Ill.

[21] Appl. No.: 386,340

[22] Filed: Jul. 27, 1989

[51] Int. Cl.[5] .................... G06F 11/10; G11C 29/00
[52] U.S. Cl. ................................. 371/21.6; 371/51.1
[58] Field of Search ................. 371/10.1, 10.2, 13, 371/21.6, 29.1, 40.1, 51.1

[56] References Cited

U.S. PATENT DOCUMENTS

| | | | |
|---|---|---|---|
| 4,371,930 | 2/1983 | Kim | 371/13 X |
| 4,475,194 | 10/1984 | LaVallee et al. | 371/10.2 |
| 4,535,455 | 8/1985 | Peterson | 371/13 |
| 4,621,364 | 11/1986 | Tschoepe | 371/13 X |

OTHER PUBLICATIONS

"VBAT VME Bus Anomaly Trigger", Electronic Products, 1987, Babara Sacks, Ultraview Corporation.

Primary Examiner—Stephen M. Baker
Attorney, Agent, or Firm—Flynn, Thiel, Boutell & Tanis

[57] ABSTRACT

A computer system reads data from selected locations in a memory while each address applied to the memory is temporarily stored in a register. If a data error is detected, two flipflops are set, one of which can generate and interrupt the central processing unit, and the other of which disables an AND gate through which a load signal is applied to the register in order to disable the register. An arrangement for resetting the second flipflop includes a third flipflop which is set and reset respectively at the beginning and end of each input/output cycle and which has an output coupled to one input of an AND gate having a further input to which is applied a signal selectively actuable by the central processing unit, the output of the AND gate and a system reset signal being applied to inputs of an OR gate which has its output connected to a reset input of the second flipflop.

6 Claims, 3 Drawing Sheets

METHOD AND APPARATUS FOR ERROR DETECTION AND LOCALIZATION

FIELD OF THE INVENTION

This invention relates generally to an arrangement for detecting memory errors in a computer system and, more particularly, to such an arrangement which has the capability to record address information corresponding to a location at which a memory error is detected.

BACKGROUND OF THE INVENTION

In a computer system, various approaches may be used to ensure that data stored in the memory is accurately retrieved from the memory. One approach which has been in wide commercial use for many years is the use of parity. In particular, as the data is stored in the memory, one or more parity bits are generated in a known fashion as a function of the data, and are stored with the data. Then, when the data is subsequently retrieved from the memory, the data is used to regenerate one or more parity bits according to the same function, such parity bit(s) then being compared to the parity bit(s) stored with the data. If the compared bits are identical, it is assumed that the data has been accurately retrieved. On the other hand, if the compared bits are not identical, an error has occurred.

Memory errors can be broken down into two categories, in particular, hard errors and transient errors. Hard errors are those which are permanently present, and can be easily detected. Most computers are designed to do a brief check of random access memory when they are turned on, and they will typically detect hard errors during this test and subsequently avoid using the portions of memory which produced errors. Thus, hard errors do not usually present a serious problem.

Transient errors, on the other hand, are errors which are marginal, and may come and go. They may, for example, occur only when certain specific patterns of data are stored in the memory. Transient errors frequently are not picked up by the tests which the computer does when it is turned on, and thus the portions of memory having these transient problems may be utilized by the computer with no notice that errors may occur. Of course, the parity detection schemes discussed above are usually capable of detecting the transient error when it occurs.

In conventional systems, the output line from the parity detection circuit is frequently coupled to an interrupt input of the central processing unit, so that processing unit is interrupted in response to the occurrence of an error and does not continue its processing using incorrect data. Traditionally, the interrupt promptly notified the processing unit of the error before the processing unit could lose track of the memory location it was accessing at the time the error occurred. However, advances in technology have significantly increased the speeds of processing units. High speed processing units like the Intel 80386 microprocessor frequently prefetch instructions and place them in a queue. By the time a memory error is detected and interrupts a processing unit operating in a prefetch and queuing mode, the processing unit may have forged ahead sufficiently during the interim so that it is not at all clear what address was being accessed at the time the error occurred. Thus, a problem is that it is difficult to determine which portion of memory caused the error, particularly in view of the fact that transient errors frequently cannot be easily made to repeat themselves.

An object of the present invention is to provide an arrangement which facilitates accurate detection of the specific portion of memory which produced an error even in an environment where a processing unit is operating in a prefetch and queuing mode.

Objects and purposes of the invention are met by providing an apparatus which includes a memory having a plurality of selectively addressable locations, a processing unit which is operatively coupled to the memory and can selectively address and read storage locations therein, an error detecting arrangement for detecting errors in the data being read from the storage locations, and a recording arrangement responsive to detection of an error by the detecting arrangement for recording address information corresponding to the storage location from which the erroneous data was read.

BRIEF DESCRIPTION OF THE DRAWINGS

An exemplary apparatus which embodies the present invention is described in detail hereinafter with reference to the accompanying drawings, in which.

DETAILED DESCRIPTION

Figure 1:
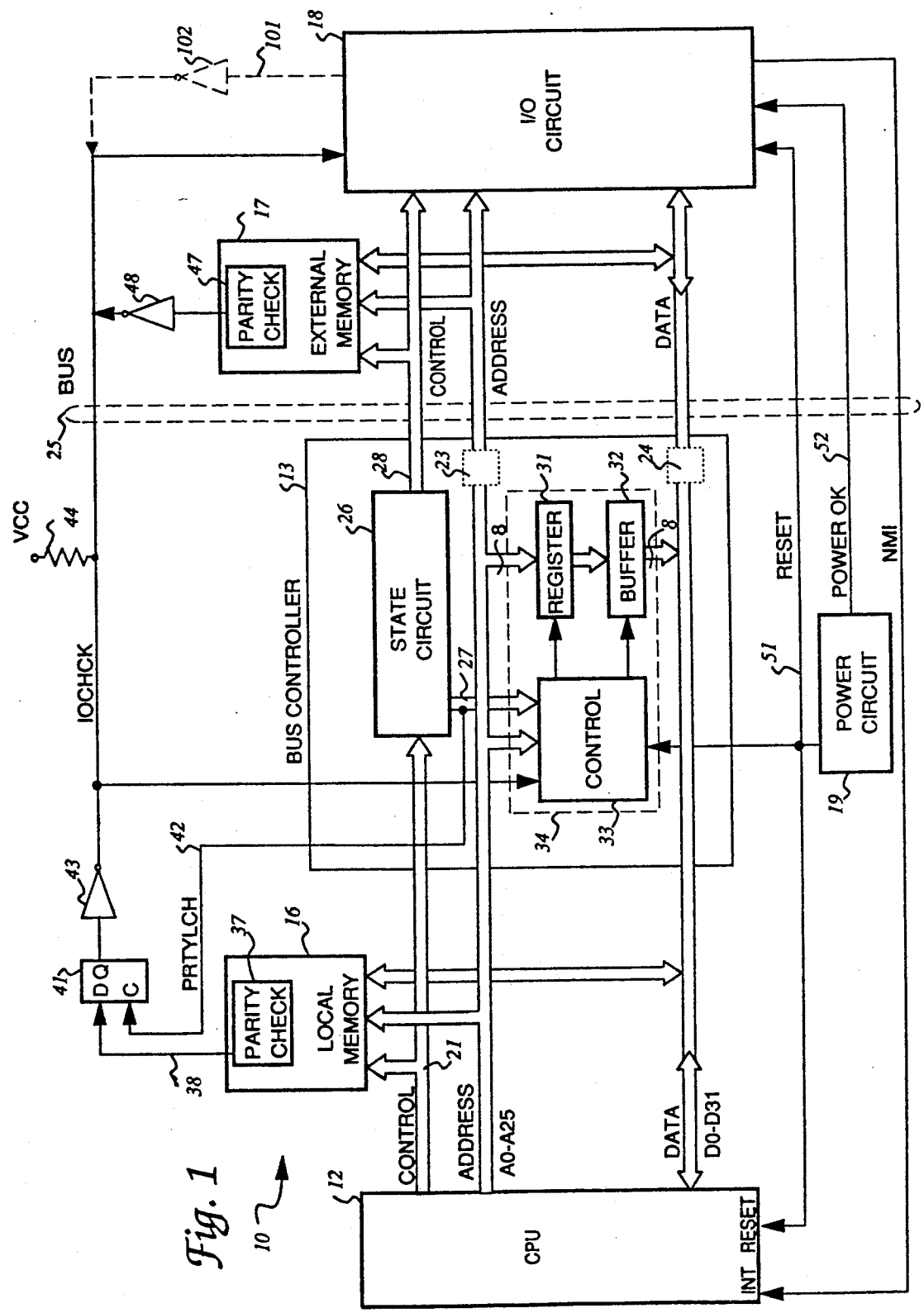
FIG. 1 is a schematic block diagram of a computer system embodying the present invention.

Referring to FIG. 1, a computer system 10 embodying the present invention includes a central processing unit (CPU) 12, a bus controller circuit 13, a local memory 16, an external memory 17, an I/O circuit 18, and a power circuit 19.

The CPU 12 could be almost any conventional and commercially available part, and int he preferred embodiment is an Intel 80386, which is a commercial high speed, high performance microprocessor. The CPU 12 sends and receives data across a 32-bit data bus D0-31, outputs addresses on a 26-bit address bus A0-A25, and produces several conventional control lines 21 which facilitate the routing and timing of data transfers. Since the control lines 21 are conventional, they are not described in detail.

The bus controller 13 includes circuits 23 and 24 which break address bus A0-A25 into two portions and data bus D0-31 into two portions, so that the portion to the left of the bus controller 13 in FIG. 1 can be controlled independently of the portion to the right thereof. In other words, while the CPU 12 is controlling the portions of these buses to the left of the bus controller 13, the bus controller 13 can control the portions to its right, which with other signals are referred to collectively as a system bus 25. Under certain circumstances, the circuits 23 and 24 may essentially be electrically transparent, since they are not a necessary and essential part of the subject matter of the present invention, they will be treated as electrically transparent for purposes of the discussion which follows.

The bus controller 13 also includes a state circuit 26 which is responsive to the control signals 21 from the CPU 12 for producing various control signals 27 and 28. The state circuit 26 and the control signals which it produces are conventional and not a part of the present invention, and are therefore not described in detail here.

Figure 2:
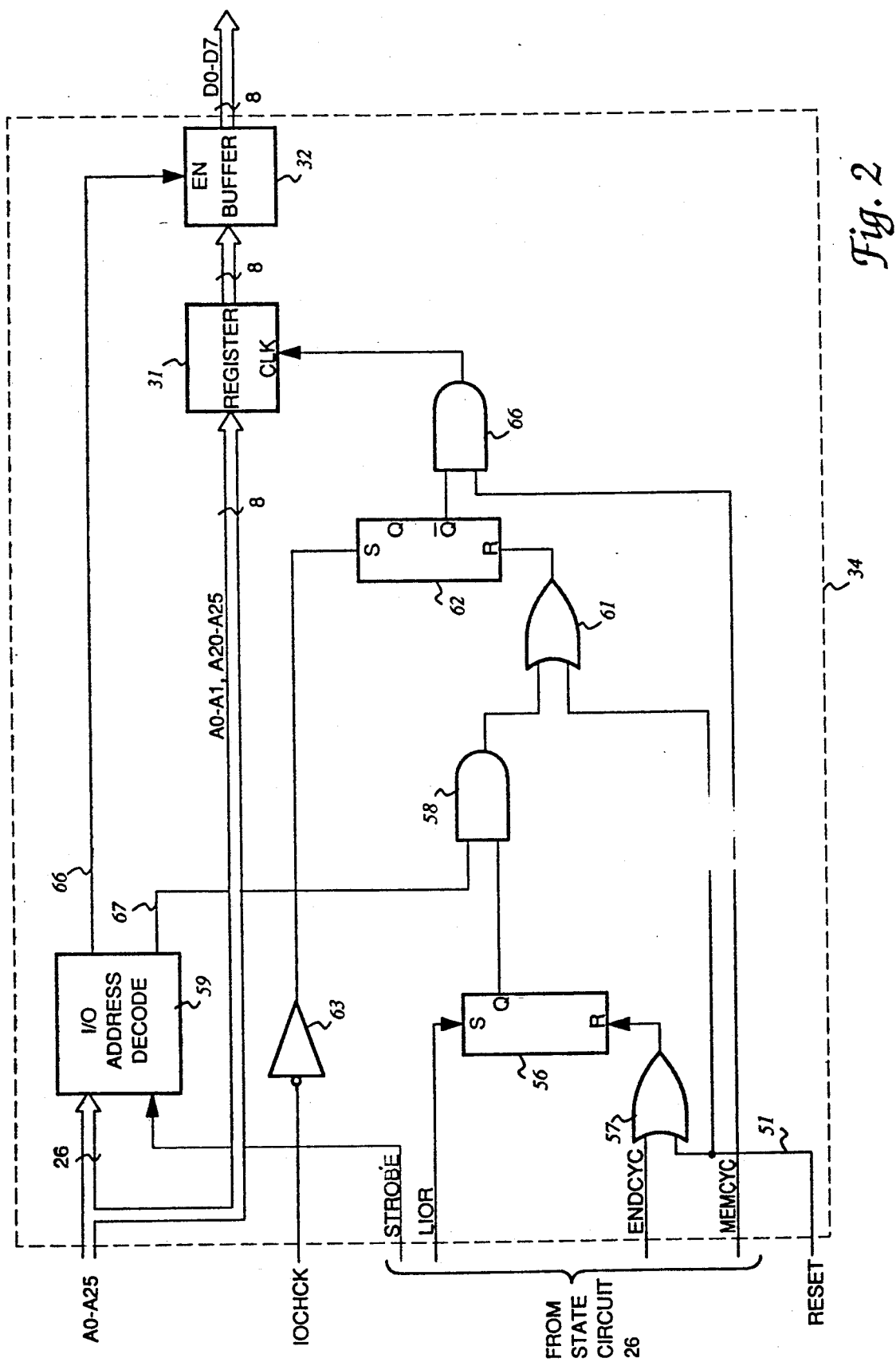
FIG. 2 is a schematic diagram of a portion of the circuit of FIG. 1.

The bus controller 13 also includes an 8-bit recording register 31 having its inputs connected to eight lines of the address bus, a buffer 32 having eight inputs connected to the eight outputs of the register 31 and having eight outputs connected to the data bus, and a control circuit 33 which supplies control signals to the register 31 and buffer 32. The register 31, buffer 32 and control circuit 33 together comprise a circuit 34 which is shown in FIG. 2 and described in more detail hereinafter.

Still referring to FIG. 1, the local memory 16 is operatively coupled to the data bus D0-31, address bus A0-25, and control bus 21, and has a plurality of selectively addressable locations in which the CPU 12 can store data and from which the CPU 12 can selectively read the data it has stored. As data is stored in a location of the local memory 16, the local memory 16 generates and stores one or more parity bits in a conventional manner. The local memory 16 includes a conventional parity check circuit 13 which, as a data word is read from the memory 16 and sent to the CPU 12, generates one or more parity bits for the word and compares them to the parity bits stored with the word. The parity bits generated by the circuit 37 are normally identical to the stored parity bits, and the parity check circuit 37 thus normally outputs a logic low voltage on its output line 38 to indicate that no error has been detected. On the other hand, if the parity bits generated by the circuit 37 are different from the stored parity bits, then an error has occurred and the circuit 37 produces a logic high voltage on its output line 38 to indicate the presence of an error. The local memory 16, including the parity check circuit 37, is entirely conventional and therefore not described here in further detail.

The output line 38 of the parity check circuit 37 is connected to the data input of a D-type flipflop 41. A line 42 carrying a parity latch signal PRTYLCH, which is one of the control signals 27 produced by the state circuit 26, is connected to the clock input of the flipflop 41. In a conventional manner, the state circuit 26 produces one short pulse on the line 42 each memory read cycle at a point in time when the output of parity check circuit 37 is a valid indication of whether a parity error is present, as a result of which the flipflop 41 will be set if a parity error has occurred. The output of the flipflop 41 is connected to the input of an inverter 43 having an open collector output, the output of the inverter 43 being connected to an input/output channel check line IOCHCK which is normally maintained at a logic high voltage by a pull-up resistor 44. If a parity error occurs and causes the flipflop 41 to be set, the logic high voltage which will then be presented at the input of the inverter 43 causes the output of the inverter 43 to pull the line IOCHCK to a logic low voltage.

The external memory 17 is effectively identical to the local memory 16, except that it has a larger number of addressable storage locations. The output of its parity checking circuit 47 is connected through an inverter 48 with an open collector output to the channel check line IOCHCK. If the parity check circuit 47 of the external memory 17 detects a parity error, it will cause the inverter 48 to change the channel check signal IOCHCK from a logic high voltage to a logic low voltage.

A power circuit 19 produces operating voltages which are supplied to circuits throughout the system. The power circuit 19 has a RESET output line 51 which is connected to various components throughout the system, including the CPU 12, bus controller 13 and I/0 circuit 18, and the power circuit 19 products a reset pulse on the RESET line 51 at power-up in order to ensure that all components begin operation from a known condition. The power circuit 19 also has a POWER OK output line which is connected to the I/O circuit 18. During normal operation, the POWER OK line is a logic high voltage, but as soon as a brown-out or power loss begins to occur, the power circuit 19 produces a logic low voltage on the POWER OK line 52 in order to notify certain components of the system that a power loss is imminent and an orderly shut down should be carried out.

As mentioned above, the portion 34 of the bus controller 13 is shown in FIG. 2, and FIG. 2 will now be described in detail. Referring to FIG. 2, the 8-bit recording register 31 has its inputs connected to the six most significant bits (MSBs) A20-A25 and the two least significant bits (LSBs) A0-A1 of the address bus. The circuit of FIG. 2 receives four control lines from the state circuit 26 of FIG. 1, including a strobe line STROBE on which the state circuit 26 produces a pulse during each input/output cycle, a local input/output read signal LIOR on which the state circuit 26 produces a pulse at the beginning of an input/output cycle for local devices (those to the left of the bus 25 in FIG. 1), an end of cycle line ENDCYC on which the state circuit 26 produces a pulse toward the end of each input/output cycle, and a memory cycle line MEMCYC on which the state circuit 26 produces a pulse during each memory read cycle. The local input/output read line LIOR is connected to the set input of a set-reset (SR) flipflop 56, the flipflop 56 having its reset input connected to the output of an OR gate 57 which has its inputs connected to the line ENDCYC and the system reset line 51. The output of the flipflop 56 is connected to one input of an AND gate 58, the other input of which is connected to an output of an input/output decode circuit 59 which is discussed later. The output of the AND gate 58 is connected to one input of an OR gate 61, the other input of which is connected to the system reset line 51. The output of the OR gate 61 is connected to the reset input of an SR flipflop 62. An inverter 63 has its input connected to the channel check signal IOCHCK, and its output connected to the set input of the flipflop 62. The inverted data output of the flipflop 62 is connected to one input of an AND gate 66, the other input of which is connected to the line MEMCYC from the state circuit 26. The output of the AND gate 66 is connected to a clock input CLK of the recording register 31.

The input/output decode circuit 59 has inputs connected to the 26 lines A0-A25 of the address bus, and a further input connected to the strobe line STROBE from the state circuit 26. When a pulse occurs on the STROBE line, the I/O decode circuit 59 checks to see if the address bus is carrying one of two predetermined addresses and, if so, produces a signal on a respective one of two output lines 66 and 67, the output line 67 being the output mentioned above which is connected to the input of gate 58. The output line 66 is connected to an enable input of the buffer 32. In response to a signal on the line 66, the buffer 32 gates the contents of the register 31 onto eight lines D0-D7 of the data bus.

Figure 3:
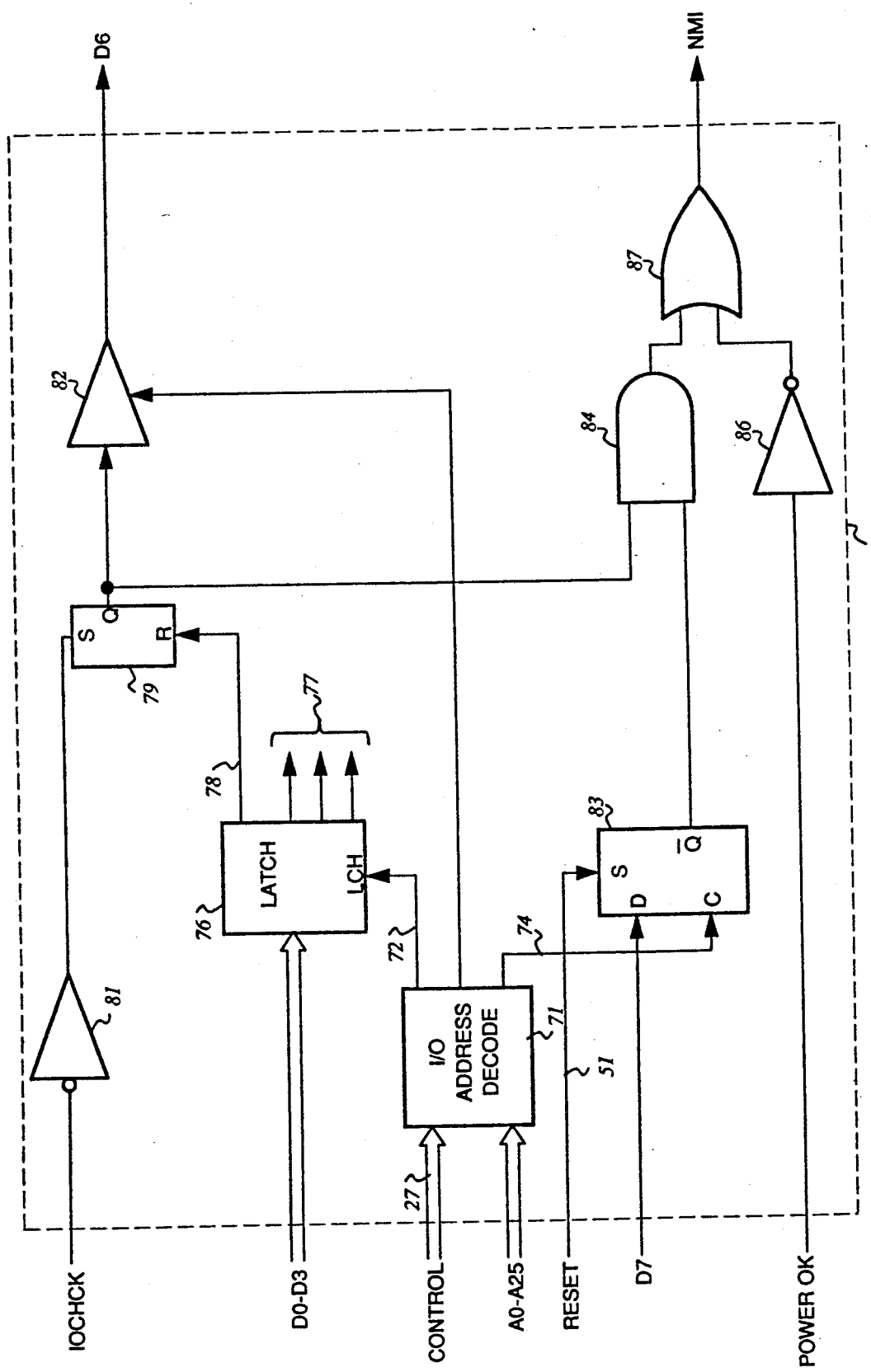
FIG. 3 is a schematic diagram of a further portion of the circuit of FIG. 1.

Turning now to FIG. 3, which shows in detail certain components from the input/output circuit 18 of FIG. 1, an input/output address decode circuit 71 is connected to the address bus A0-A25 and to the control lines 27 from the state circuit 26. In a manner similar to the decode circuit 59 of FIG. 2, circuit 71 checks during an input/output cycle for the presence on the address bus of one of three predetermined addresses and, if one is present, produces a signal on a respective one of three output lines 72, 73 and 74. The output 72 is connected to the latch input LCH of a 4-bit latch 76, the data inputs of which are connected to lines D0–D3 of the data bus. Thus, a pulse on the line 72 during an input/output cycle will cause data from the data bus to be loaded into the latch 76. Three of the outputs 77 of the data bus are used for purposes which are not pertinent to the present invention, and are thus not described in detail. The remaining output 78 is connected to the reset input of an SR flipflop 79. An inverter 81 has its input connected to the channel check line IOCHCK, and its output connected to the set input of the flipflop 79. The output of the flipflop 79 is connected to the input of a buffer 82, a control input of which is connected to the output line 73 from the decode circuit 71. The output of the buffer 82 is connected to line D6 of the data bus. When the buffer 82 is enabled by a signal on the line 73, the buffer 82 gates the state of the flipflop 79 onto line D6 of the data bus. An SR flipflop 83 has a set input connected to the system reset line 51, a data input connected to the line D7 of the data bus, and a clock input connected to the output line 74 from the decode circuit 71. Thus, a pulse on the line 74 from the decode circuit 71 causes the flipflop 83 to be loaded with the bit present on line D7 of the data bus. The inverted output of the flipflop 83 is connected to an input of an AND gate 84, the other input of which is connected to the output of the flipflop 79. An inverter 86 has its input connected to the POWER OK line from the power circuit 19 of FIG. 1, and its output connected to an input of an OR gate 87. The other input of the OR gate 87 is connected to the output of the AND gate 84, and the output of the OR gate 87 is a non-maskable interrupt signal NMI which, as shown in FIG. 1, is connected to an interrupt input INT of the CPU 12.

The operation of the preferred embodiment will now be described. Referring to FIG. 2, immediately after power is turned on, a signal on the system reset line 51 will, through the OR gates 57 and 61, reset the flipflops 56 and 62. Thereafter, each time a local input/output cycle is carried out, the state circuit 26 will produce at the beginning of the cycle a pulse on the line LIOR which sets the flipflop 56, and will produce at the end of the cycle a pulse on the line ENDCYC which, through the gate 57, resets the flipflop 56. It is important to note that this occurs only during input/output cycles, and not memory cycles. During memory cycles, the flipflop 56 remains reset, and will thus be outputting a logic low voltage to the AND gate 58 which in turn will output a logic low voltage to the gate 61, so that the gate 61 is not attempting to apply a reset pulse to the flipflop 62. The flipflop 62 will remain reset during normal operation, and will thus be outputting a logic high voltage to the gate 66 in order to enable the gate 66. Since the state circuit 26 outputs a pulse on the line MEMCYC during each memory read cycle, this pulse will be forwarded by the gate 66 to the input of the recording register 31 and will cause the recording register 31 to be loaded with the MSBs A20–A25 and the LSBs A0–A1 of the address bus during each memory read cycle.

As explained above with reference to FIG. 1, if either the local memory 16 or the external memory 17 detects a parity error as data is read therefrom, the channel check signal IOCHCK is changed from a logic high voltage to a logic low voltage. Thus, still referring to FIG. 2, the occurrence of a parity error will cause a logic low voltage to be presented to the input of the gate 63, which in turn will apply a logic high voltage to the set input of the flipflop 62 and thereby set the flipflop 62. The flipflop 62 will thereafter be outputting a logic low voltage to the AND gate 66, thereby disabling the AND gate 66 so as to prevent the signal MEMCYC from making any change in the recording register 31. The signal MEMCYC occurs shortly before a parity error can be detected and signaled on the line IOCHCK, and the disabling of gate 66 by flipflop 62 will thus occur just after the register 31 has been loaded with the MSBs and LSBs of the address for the location at which the parity error occurred. Since the disabling of the gate 66 prevents subsequent pulses on the line MEMCYC from reaching the register 31, the register 31 will continue to hold the address information for the location at which the parity error occurred.

Meanwhile, referring to FIG. 3, the system reset on line 51 following power-up will set the flipflop 83, but the CPU will subsequently place a binary "0" on line D7 of the data bus and carry out an input/output cycle using an address which produces a pulse on the line 74 in order to clear the flipflop 83, so that for normal operation the flipflop 83 is outputting a logic high voltage to the gate 84. At about the same time, the CPU will carry out two successive input/output cycles producing successive pulses on the line 72 while successively outputting on line D3 of the data bus a binary "1" and then a binary "0", so that the latch 76 toggles the line 78 in order to reset the flipflop 79. During normal operation, the flipflop 79 will remain reset and will output a logic low voltage to the gate 84, so that the gate 84 is outputting a logic low voltage to the gate 87. Since, during normal operation, the POWER OK line will be a logic high voltage, the inverter 86 will also be outputting a logic low voltage to the gate 87. Thus, the gate 87 will normally output a logic low voltage.

If the power circuit 19 of FIG. 1 detects a brown-out or a power loss and changes the POWER OK line to a logic low voltage, the inverter 86 will send a logic high voltage to the gate 87 which in turn will provide a logic high voltage on the non-maskable interrupt line NMI in order to interrupt the CPU 12 of FIG. 1 so that the CPU 12 can terminate processing in an orderly manner. However, assuming no problem with system power in encountered, the other event of interest is the occurrence of a parity error as data is read from one of the memories 16 and 17. The parity error will, as discussed above, cause the IOCHCK line to change from a logic high voltage to a logic low voltage, as a result of which the inverter 81 in FIG. 3 will supply a logic high voltage to the set input of flipflop 79, thereby setting the flipflop. Consequently, the gate 84 will forward the logic high voltage through the gate 87 to the CPU 12 in order to interrupt the CPU 12.

In response to such an interrupt, the CPU 12 will first cause the address decode circuit 71 of FIG. 3 to produce a signal on line 73 which enables the buffer 82 so that the buffer 82 sends the stare of flipflop 79 to the CPU across the data bus. If the CPU were to thus receive a binary "0", it would know that the interrupt was caused by the POWER OK line rather than a parity error, and would proceed to immediately terminate processing. On the other hand, if the CPU receives a binary "1", it would know that the interrupt was caused by a parity error, and would proceed as follows.

First, the CPU would use the decode circuit 59 to produce a signal on line 66 which enables the buffer 32 so that the buffer 32 sends the contents of the recording register 31 to the CPU across the data bus. By examining the six most significant address bits from the register 31, the CPU can determine which 1 MB (megabyte) bank of memory contains the location which produced the parity error, and by examining the two least significant address bits the CPU can determine which of the four bytes in the 32-bit word it received from the memory produced the parity error. The CPU can then take appropriate action, which might involve one of several approaches. For example, the CPU might simply display or print the address information obtained from recording register 31, in order to permit a technician to locate and change the memory modules or memory chips in question. Alternatively, if the memory in question is of a conventional type which the CPU can selectively disable, the CPU can disable the memory or portion thereof which produced the parity error in order to map it out of active use. According to yet another approach, the CPU could run memory diagnostics on the bank of memory which contains the error in an attempt to further localize the particular location which caused the error. Of course, it would be within the scope of the present invention to increase the size of the register 31 so that it holds the entire address of the location which produced the error, in which case diagnostics to further localize the error would not be necessary. In the preferred embodiment, the eight bits of address information stored in the register 31 are sufficient to localize the error to a particular single in-line memory module (SIMM) which can then be replaced, and the expense of increasing the size of the register 31 in order to store additional address information is thus unnecessary.

Once the source of the parity error has been located and remedied, the CPU will be ready to resume normal operation. In order to do so, the CPU uses the decode circuit 71 and latch 76 to produce a pulse on line 78 which resets the flipflop 79, and uses the decode circuit 59 to produce a pulse on line 67 during an input/output cycle (in which the flipflop 56 is set) so that the AND gate 58 will output a logic high voltage to and through gate 61 in order to reset the flipflop 62.

During normal operation, circumstances may arise where it is desirable for the CPU to completely ignore memory parity errors, either briefly or indefinitely. In either case, the CPU can set the flipflop 83 of FIG. 3 so that it outputs a logic low voltage to disable the AND gate 84, as a result of which a parity error can set the flipflop 79 but the output of the flipflop 79 cannot travel through the gates 84 and 87 in order to interrupt the CPU. The CPU can, of course, subsequently intentionally clear the flipflop 83 in order to again enable interrupts resulting from parity errors.

The present invention has been disclosed in the specific context of detecting memory parity errors, but it will be recognized that it is also applicable to other types of errors. For example, the I/O circuit 18 of FIG. 1 facilitates communication with a number of conventional and not-illustrated peripheral devices which the CPU 12 can selectively address using the address bus A0–A25, for example disk drives and serial and parallel I/O ports. An output line 101 from the circuit 18 can be connected through an inverter 102 with an open collector output to the line IOCHCK, and can produce a pulse on the line IOCHCK while the CPU is addressing the peripheral device if the circuit 18 detects an error associated with the peripheral device. The pulse on the IOCHCK line would produce results similar to those discussed above for signals produced on line IOCHCK by either of the parity check circuits 37 and 47.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follow:

1. An apparatus, comprising: a memory having a plurality of selectively addressable storage locations, a processing unit which is operatively coupled to said memory and can selectively address said storage locations and read data therefrom in respective memory read cycles, error detecting means for checking data being read from said storage locations for errors, and means responsive to detection of an error by said detecting means for recording address information corresponding to the storage location from which the erroneous data was read; wherein said recording means includes a register, means for loading said register with said address information each time said processing unit reads data from said memory, and means responsive to detection of an error by said detecting means for inhibiting loading of said register; wherein said means for loading said register includes a first AND gate having a first input connected to a register load signal, having a second input, and having an output connected to a load control input of said register; wherein said means for inhibiting loading of said register includes a first flipflop having an output connected to said second input of said first AND gate and includes means responsive to detection of an error by said detecting means for causing said first flipflop to change from a first logical state to a second logical state, including an error detecting signal from said error detecting means being applied to a set input of said first flipflop; and including further means responsive to signals from said processing unit for changing said first flipflop from said second logical state to said first logical state, said further means including a first OR gate having a first input coupled to a system reset line, having a second input, and having an output coupled to a reset input of first flipflop, including a second AND gate having a first input coupled to a signal which can be selectively actuated by said processing unit during an input/output cycle, having a second input, and having an output coupled to said second input of said first OR gate, including a second flipflop having a set input coupled to a line on which said processing unit produces a pulse at a beginning portion of each input/output cycle, having a reset input, and having an output which is coupled to said second input of said second AND gate, and including a second OR gate having a first input coupled to a line on which said processing unit produces a pulse at an end portion of each input/output cycle, having a second input coupled to said system reset line, and having an output connected to said reset input of said second flipflop.

2. An apparatus of claim 1, wherein said address information is a subset of the bits of the address for the storage location which produced the error, including a plurality of the most significant address bits and a plurality of the least significant address bits.

3. An apparatus of claim 1, wherein said memory sends data to said processing unit across a data bus, including a buffer having inputs connected to data outputs of said register and having outputs connected to said data bus, and including means responsive to signals from said processing unit for enabling said buffer to gate data from the outputs of said register onto said data bus.

4. An apparatus of claim 1, wherein said detecting means checks the parity of data read from said storage locations in said memory, said errors detecting by said detecting means being parity errors.

5. An apparatus of claim 1, including interrupt generating means responsive to detection of an error by said error detecting means for interrupting said processing unit, said interrupt generating means including a third flipflop having a set input coupled to said error detection signal, having a reset input coupled to a signal which can be selectively actuated by said processing unit, and having an output, including a fourth flipflop and means for selectively setting and resetting said fourth flipflop in response to signals from said processing unit, said fourth flipflop having an output, including a third AND gate having first and second inputs respectively coupled to said outputs of said third and fourth flipflops, and having an output, and including a third OR gate having a first input coupled to said output of said third AND gate, having a second input coupled to a power status signal, and having an output which is coupled to an interrupt input of said processing unit.

6. An apparatus of claim 5, including a system bus and a system bus controller circuit, said system bus controller circuit being coupled directly to said processing unit and being coupled by said system bus to said memory and to an input/output circuit, said register, said means for loading said register and said means for inhibiting loading of said register being portions of said system bus controller, and said interrupt generating means being a portion of said input/output circuit.

* * * * *